United States Patent Office 2,847,303
Patented Aug. 12, 1958

2,847,303
COPPER-BASE ALLOYS

Matei Pruna, Paris, France, assignor of one-fourth to Georges René Jean Lafeuille, Paris, and one-fourth to Pierre Lafeuille, Oise, France No Drawing. Application May 21, 1957
Serial No. 660,461

Claims priority, application France January 4, 1957

11 Claims. (Cl. 75—153)

This invention relates to novel copper-base alloys and has for its principal object to provide copper-base alloys having highly desirable physical and mechanical properties, as hereinafter set forth.

According to the present invention a copper-base alloy consists of, by weight:

|  | Percent |
|---|---|
| Zirconium | 0.01 to 1 |
| Phosphorus | 0.005 to 0.5 |
| Iron | 0 to 0.5 |
| Silicon | 0 to 0.5 |
| Cadmium | 0 to 2 | and the remainder consists of copper with at most only traces of other elements.

The aforesaid alloys, which are inexpensive to make, combine in themselves high electrical conductivity, high thermal conductivity, high traction resistance, great hardness, substantial elongation, high resilience, high tenacity under heat and easy machining qualities. They can be welded or brazed and they may form the supporting material for electrolytic deposits, similarly to commercial copper. Furthermore, these alloys may be used in the production of resistance welding electrodes which increase the output of welding machines very considerably whilst diminishing the current consumption necessary for welding. They weld ordinary steels with substantially the same ease as aluminium and alloys thereof.

An important property of the alloys according to the invention is that, after cold-working, they possess properties which make them highly suitable for purposes where the metal is required to retain its hardness and tenacity at high temperatures, e. g. up to 500° C.

Fundamentally, the alloys comprise, in addition to copper, proportions of zirconium and phosphorus as stated above. However, in order to facilitate the production of the alloy, it is possible to add to these essential elements the following elements in the proportions indicated hereinafter:

|  | Percent by weight |
|---|---|
| Iron | 0.005 to 0.5 |
| Silicon | 0.005 to 0.5 |

The compositions preferably adopted are as follows:

|  | Percent by weight |
|---|---|
| Zirconium | 0.05 to 0.20 |
| Phosphorus | 0.005 to 0.03 |
| Iron | 0.005 to 0.01 |
| Silicon | 0.005 to 0.01 |
| The remainder | Copper |

A typical, but not limitative, example of an alloy according to the invention is as follows:

Example

|  | Percent by weight |
|---|---|
| Zirconium | 0.100 |
| Phosphorus | 0.012 |
| Iron | 0.005 |
| Silicon | 0.010 |
| The remainder | Copper |

Such alloys are conveniently produced by melting the elements, in the proportions indicated, in a crucible made, for example, of graphite. Preferably the copper is melted first and the other elements added to the molten copper.

Owing to the sensitivity of some of the constituents to the action of oxygen, it is highly desirable to exclude the access of oxygen to the molten bath by applying the means usually employed or proposed in such circumstances. Thus, there may be added substances such as sodium silicate which are capable of forming a slag which floats on the surface of the bath and insulates the bath from the atmosphere. Preferably, however, the alloy is prepared under an atmosphere of inert gas such as nitrogen or argon, or the melting operation is effected under vacuum.

The alloy in the rough-cast state exhibits similar physical and mechanical properties to those of pure, deoxidised, annealed copper of high conductivity:

| Electrical conductivity at 20° | From 90% to 96% I. A. C. S. |
|---|---|
| Heat conductivity at 20° | From 0.83 to 0.89 cal./cm.$^2$/cm./sec./degree. |
| Tensile strength | 18 to 20 kg./mm.$^2$. |

The alloy thus obtained has great plasticity under heat and in the cold state. It may be wire-drawn, forged, rolled, drawn and stamped, having the same behaviour as pure, deoxidised, annealed copper of high conductivity.

The highest mechanical properties and hot tenacity of an alloy according to the present invention are obtained after cold-working the alloy by any one of the usual cold-working processes, e. g. forging, rolling, drawing or stamping.

Before cold-working, it is preferable to carry out a homogenising annealing operation, for example at about 900°, for about an hour, and then to cool, for example in water or air.

The extent of cold-working is preferably such as will be equivalent to a reduction in cross-section by about 50 times, the amount of cross-section reduction being expressed by the formula $$\frac{S_0 - S}{S_0} \times 100$$

wherein $S_0$ designates the initial cross-section and $S$ the final cross-section. However, in practice the amount of cross-sectional reduction leading to the desired improvement varies according to the cross-section of the pieces which are to be cold-worked. Thus, with pieces of small cross-section, a reduction in cross-section by only 20 times may suffice, whilst with pieces of large cross-section it may be necessary to reduce the cross-section by up to 60 times.

The specific alloy of the foregoing example affords, after cold-working, the following physical and mechanical properties:

| Electrical conductivity at 20° | 90% to 96% I. A. C. S. |
|---|---|
| Thermal conductivity at 20° | 0.83 to 0.89 cal./cm.$^2$/cm./sec./degree. |
| Tensile strength | 42 to 48 kg./mm.$^2$. |
| 10/1000/30 Brinell hardness | 110 to 120 kg./mm.$^2$. |
| Elongation | 9 to 10%. |
| Resilience | 9 to 10 kilogrammetres per cm.$^2$. |

Hot tenacity, the temperature at which recrystallisation of the cold-worked metal begins, is of the order of 500° C. If the duration of heating does not exceed 1 hour, for temperatures not exceeding 500° C., the mechanical characteristics of the alloy are subjected to only very slight disturbance. This raising of the recrystallisation temperature of pure, deoxidised, high-conductivity copper to high temperatures is due to the presence of the alloying elements and to the cold-working. Thus, the alloys of the present invention are alloys of the "solid solution" type whose physical and mechanical properties are obtained by cold-working.

These alloys are particularly advantageous for electrical constructions and industries connected therewith; thus, for example, it is possible to use them:

(a) As electrodes of various forms for resistance welding machines, for which a high conductivity, great hardness and hot tenacity are required,
(b) As current conductors in electric traction and in various applications in the electrical and electronic industries, where conductivity and hardness play an important part,
(c) As parts for electrical apparatus,
(d) As filler metal in welding and brazing.

The alloys according to the present invention can be used in the relatively soft state in which they are originally cast and not cold-worked, in the form of moulded pieces and in the hardened state, i. e. after cold-working, e. g., by forging, rolling, drawing, wire-drawing or stamping.

According to a further feature of the invention, the aforesaid alloys, consisting essentially of copper, zirconium and phosphorus, and optionally also iron and silicon in the quantities stated, also contain up to 2% by weight of cadmium. By the inclusion of cadmium it is possible to improve still further some of the properties of the alloys, more especially the mechanical properties, without prejudicing the advantageous property which they exhibit of recrystallising only at high temperature.

The invention, therefore, further comprises alloys of the character already set forth which, in addition, contain cadmium in the proportion of 0.1 to 2% by weight; the proportion preferably adopted is 0.6 to 1.2% by weight.

These alloys are also of the solid solution type and acquire an advantageous hardened effect after cold-working.

Generally, such alloys containing cadmium afford a good resistance to traction and fatigue, good hardness and high electrical and thermal conductivity; moreover their recrystallisation temperature is high.

The cold-working can be carried out as described above and may be preceded by an annealing operation, followed by a cooling operation.

The principal characteristics of the alloys containing from 0.6 to 1.2% by weight of cadmium are as follows (after cold-working):

| | |
|---|---|
| Resistance to traction | 47–50 kg./mm.² |
| Elastic limit | 39–47 kg./mm.² |
| Elongation | 5–10%. |
| Brinell hardness (10/1000/30) | 115–140 kg./mm.² |
| Recrystallisation temperature | 500° C. |
| Electrical conductivity | 85–95% I. A. C. S. |
| Thermal conductivity | 0.80–0.83 cal./cm./cm.²/sec./degree C. |

Particularly advantageous alloys are those containing 1% by weight of cadmium.

The alloys containing cadmium can be used not only for the purposes indicated for the alloys of this invention which do not contain cadmium but, owing to their good resistance to traction and to repeated stresses, they are suitable for use as electric lines carried by spaced pylons and for frictional contact pieces which are used as current conductors, e. g. brushes and collecting rings.

I claim:

1. A copper-base alloy which consists of, by weight:

| | Percent |
|---|---|
| Zirconium | 0.05 to 0.20 |
| Phosphorus | 0.005 to 0.03 |
| Iron | 0.005 to 0.01 |
| Silicon | 0.005 to 0.01 | and the remainder consisting of copper with at most only traces of other elements.

2. A copper-base alloy which consists of, by weight:

| | Percent |
|---|---|
| Zirconium | 0.1 |
| Phosphorus | 0.012 |
| Iron | 0.005 |
| Silicon | 0.01 | and the remainder consisting of copper with at most only traces of other elements.

3. A copper-base alloy which consists of, by weight:

| | Percent |
|---|---|
| Zirconium | 0.01 to 1 |
| Phosphorus | 0.005 to 0.5 |
| Cadmium | 0.1 to 2 | and the remainder consisting of copper with at most only traces of other elements.

4. A copper-base alloy which consists of, by weight:

| | Percent |
|---|---|
| Zirconium | 0.01 to 1 |
| Phosphorus | 0.005 to 0.5 |
| Cadmium | 0.6 to 1.2 | and the remainder consisting of copper with at most only traces of other elements.

5. A copper-base alloy which consists of, by weight:

| | Percent |
|---|---|
| Zirconium | 0.01 to 1 |
| Phosphorus | 0.005 to 0.5 |
| Cadmium | 1 | and the remainder consisting of copper with at most only traces of other elements.

6. A copper-base alloy which consists of, by weight:

| | Percent |
|---|---|
| Zirconium | 0.01 to 1 |
| Phosphorus | 0.005 to 0.5 |
| Cadmium | 0.1 to 2 |
| Iron | 0.005 to 0.01 |
| Silicon | 0.005 to 0.01 | and the remainder consisting of copper with at most only traces of other elements.

7. A copper-base alloy which consists of, by weight:

| | Percent |
|---|---|
| Zirconium | 0.01 to 1 |
| Phosphorus | 0.005 to 0.5 |
| Cadmium | 0.6 to 1.2 |
| Iron | 0.005 to 0.01 |
| Silicon | 0.005 to 0.01 | and the remainder consisting of copper with at most only traces of other elements.

8. A copper-base alloy which consists of, by weight:

| | Percent |
|---|---|
| Zirconium | 0.01 to 1 |
| Phosphorus | 0.005 to 0.5 |
| Cadmium | 1 |
| Iron | 0.005 to 0.01 |
| Silicon | 0.005 to 0.01 | and the remainder consisting of copper with at most only traces of other elements.

9. A copper-base alloy which consists of, by weight:

| | Percent |
|---|---|
| Zirconium | 0.1 |
| Phosphorus | 0.012 |
| Iron | 0.005 |
| Silicon | 0.01 |
| Cadmium | 1.0 | and the remainder consisting of copper with at most only traces of other elements.

10. A copper-base alloy containing about 0.01% to 1% zirconium, 0.005 to 0.5% phosphorus and the balance copper.

11. A copper-base alloy as defined in claim 10 which has been cold-worked.

References Cited in the file of this patent

UNITED STATES PATENTS

| 2,097,816 | Hensel et al. | Nov. 2, 1937 |
| 2,172,968 | De Boer | Sept. 12, 1939 |
| 2,195,433 | Silliman | Apr. 2, 1940 |
| 2,331,088 | Went et al. | Oct. 5, 1943 |
| 2,479,311 | Christensen et al. | Aug. 16, 1949 |

FOREIGN PATENTS

| 503,753 | Great Britain | Apr. 11, 1939 |

OTHER REFERENCES

Metallurgy of Copper, Newton and Wilson, John Wiley & Sons, Inc., New York, 1942. Pages 391–393.

"The Metallurgy of Zirconium," Lustman and Keoze, 1st ed., McGraw-Hill Book Co., Inc., New York, 1955. Page 39 (chapter 2).